(12) United States Patent
Givol et al.

(10) Patent No.: US 10,657,555 B2
(45) Date of Patent: May 19, 2020

(54) SYSTEMS AND METHODS FOR MANAGING MERCHANDISING CARD REMINDERS

(71) Applicant: Capital One Services, LLC, McLean, VA (US)

(72) Inventors: Dan Givol, Arlington, VA (US); Saumya Singh, Fairfax, VA (US); Anand Kumar, Vienna, VA (US); Michelle S. Olenoski, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/832,449

(22) Filed: Dec. 5, 2017

(65) Prior Publication Data

US 2019/0164186 A1 May 30, 2019

Related U.S. Application Data

(63) Continuation of application No. 15/823,089, filed on Nov. 27, 2017.

(51) Int. Cl.
*G06Q 30/02* (2012.01)
*G06Q 30/00* (2012.01)
(Continued)

(52) U.S. Cl.
CPC ..... *G06Q 30/0226* (2013.01); *G06Q 20/0658* (2013.01); *G06Q 30/01* (2013.01);
(Continued)

(58) Field of Classification Search
CPC combination set(s) only.
See application file for complete search history.

(56) References Cited

U.S. PATENT DOCUMENTS 8,700,709 B2  4/2014  Axelrod et al.
9,152,963 B2  10/2015  Blackhurst et al.
(Continued)

OTHER PUBLICATIONS

"Push Notification Best Practices: 35 Tips for Dramatically Better Messages", by KC Karnes. Sep. 19, 2017. Pages (Year: 2017).*
(Continued)

*Primary Examiner* — William A Brandenburg
(74) *Attorney, Agent, or Firm* — Finnegan, Henderson, Farabow, Garrett & Dunner, L.L.P.

(57) ABSTRACT

The disclosed embodiments provide systems, methods, and techniques for managing merchandising cards. A merchandising card may be, for example, a gift card, loyalty card, or the like. Consistent disclosed embodiments, a system for managing merchandising cards may include one or more memory devices storing instructions and one or more processors configured to acquire, from a device over a network, a plurality of locations associated with the device, the device locations being acquired at different instances in time within a predetermined period of time. Additionally, the one or more processors may be configured to calculate an overall merchant confidence rating for a merchant using the device locations. Further, the one or more processors may be configured to, based on the overall merchant confidence rating, determine that the merchant matches a merchant that is associated with merchandising card, and send a reminder a user of the device.

16 Claims, 7 Drawing Sheets

(51) Int. Cl.
*H04W 4/021* (2018.01)
*G06Q 20/06* (2012.01)
*G06Q 30/06* (2012.01)
*H04L 29/08* (2006.01)
*G06Q 20/12* (2012.01)

(52) U.S. Cl.
CPC ..... *G06Q 30/0205* (2013.01); *G06Q 30/0227* (2013.01); *G06Q 30/0233* (2013.01); *G06Q 30/0259* (2013.01); *G06Q 30/0261* (2013.01); *G06Q 30/0268* (2013.01); *G06Q 30/0609* (2013.01); *H04L 67/26* (2013.01); *H04W 4/021* (2013.01); *G06Q 20/12* (2013.01)

(56) References Cited

U.S. PATENT DOCUMENTS

| | | |
|---|---|---|
| 9,225,789 B2 | 12/2015 | Jensen et al. |
| 9,288,616 B2 | 3/2016 | Cherry et al. |
| 9,338,759 B2 | 5/2016 | Chowdhury et al. |
| 9,639,894 B1 * | 5/2017 | Arnone ............... G06Q 20/34 |
| 2007/0005416 A1 | 1/2007 | Jackson et al. |
| 2011/0251962 A1 | 10/2011 | Hruska |
| 2012/0191512 A1 * | 7/2012 | Wuoti ............... G06Q 30/0207 |
| | | 705/14.1 |
| 2014/0370910 A1 | 12/2014 | Natucci et al. |
| 2015/0149284 A1 | 5/2015 | Williams et al. |
| 2015/0248669 A1 | 9/2015 | Komman et al. |
| 2016/0183048 A1 | 6/2016 | Cherry et al. |
| 2016/0267516 A1 | 9/2016 | Walz et al. |

OTHER PUBLICATIONS

Communication and Search Report, issued from the European Patent Office in Application No. 18208709.8, dated Mar. 26, 2019 (6 pages).

* cited by examiner

SYSTEMS AND METHODS FOR MANAGING MERCHANDISING CARD REMINDERS

CROSS-REFERENCE TO RELATED APPLICATIONS

This application is a continuation of U.S. application Ser. No. 15/823,089, filed Nov. 27, 2017, the contents of which are expressly incorporated herein by reference.

TECHNICAL FIELD

The disclosed embodiments generally relate to systems and methods for managing merchandising cards and, more particularly, to systems and methods for managing merchandising card reminders.

BACKGROUND

Customers often rely on merchandising cards when buying goods or services from various merchants. Merchandising cards may include, for example, gift cards or loyalty cards. Customers may receive gift cards as gifts or prefer to use reloadable pre-paid gift cards as a way to manage spending. Customers may use loyalty cards, on the other hand, to obtain redeemable points or discounts from a merchant by buying particular a number or dollar amount of goods or services.

Due to the recent developments in technology, customers now have access to mobile applications and other systems that allow them to keep track of various merchandising cards. In some instances, customers may need multiple applications to keep track of all the types of the merchandising cards that they have obtained.

Moreover, although these applications are available to customers, customers rarely use these applications when they visit merchants. Thus, customers often do not fully obtain the benefits of their merchandising cards. For example, customers often have merchandising cards with nonzero balances, miss out on the opportunity to collect rewards points, or neglect to redeem benefits by using their collected rewards points before an expiration date. Moreover, merchants also do not often receive the full marketing and financial benefits provided by the high utilization of merchandising cards.

Thus, a need exists to provide customers with more efficient ways to manage merchandising cards and increase customer utilization of merchandising cards. In view of these and other shortcomings and problems with managing merchandising cards, improved systems and techniques for managing merchandising cards are desirable.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address disadvantages of existing systems by providing novel systems, methods, and techniques for managing merchandising cards and merchandising card reminders. Consistent with certain disclosed embodiments, a system for managing a merchandising card reminder is provided. The system may include one or more memory devices storing instructions and one or more processors. The one or more processors may be configured to execute instructions to acquire, from a device over a network, a plurality of device locations, the device locations being associated with the device and being acquired at different instances in time. The one or more processors may also be configured to execute instructions to determine a geofence associated with a merchant location, the merchant location being associated with a first merchant. Moreover, the one or more processors may be configured to determine a first merchant confidence rating based on whether the device locations are within the geofence. The one or more processors may also be configured to determine whether the first merchant confidence rating is greater than or equal to a first threshold. If the first merchant confidence rating is greater than or equal to a first threshold, the one or more processors may be configured to acquire a merchant identifier associated with the merchant location; acquire a plurality of available merchant identifiers from the financial service provider; and determine whether the first merchant identifier matches a second merchant identifier in the available merchant identifiers, the first and available merchant identifiers being associated with a merchandising card of the user of the device. Furthermore, if the first merchant identifier matches a second merchant identifier in the available merchant identifiers, the one or more processors may be configured to send a notification to the user of the device indicating that the user is a holder of the associated merchandising card.

In addition, consistent with certain disclosed embodiments, a method is provided for managing a merchandising card reminder. The method may include the step of acquiring, from a device over a network, a plurality of device locations, the device locations being associated with the device and being acquired at different instances in time. The method may also include the step of calculating a first merchant confidence rating by: determining a geofence associated with a merchant location, the merchant location being associated with a first merchant; and determining the first merchant confidence rating based on whether the device locations are within the geofence for a predetermined period of time. Further, the method may include the step of determining whether the first merchant confidence rating is greater than or equal to a first threshold. In response to determining that the first merchant confidence rating is greater than or equal to a first threshold, the method may include the steps of acquiring a first merchant identifier associated with the merchant location; acquiring a plurality of available merchant identifiers from the financial service provider; and determining whether the first merchant identifier matches a second merchant identifier in the available merchant identifiers, the first and available merchant identifiers being associated with a merchandising card of the user of the device. Further, in response to determining that the first merchant identifier matches a second merchant identifier in the available merchant identifiers, the method may include the steps of sending a notification to the user of the device indicating that the user is a holder of the associated merchandising card.

Consistent with certain disclosed embodiments, a mobile device for managing a merchandising card reminder is provided. The mobile device may include a memory device storing instructions and one or more processors. The one or more processors may be configured to acquire a plurality of mobile device locations, the device locations being acquired at different instances in time. The one or more processors may also be configured to calculate an overall merchant confidence rating based on the device locations over a predetermined period of time. Further, the one or more processors may be configured to determine whether the overall merchant confidence rating is greater than a first threshold. If the overall merchant confidence rating is greater than or equal to a first threshold, the one or more processors may be configured to acquire a merchant identifier associated with the merchant location; acquire a set of available merchant identifiers from the financial service provider; and determine whether the first merchant identifier matches a merchant identifier in the set of available merchant identifiers, the first and set of available merchant identifiers being associated with a merchandising card of the user of the mobile device. Furthermore, if the first merchant identifier matches a second merchant identifier in the available merchant identifiers, the one or more processors may be configured to send a notification to the user of the mobile device indicating that the user is a holder of the associated merchandising card.

Moreover, consistent with certain disclosed embodiments, a method is provided for managing a merchandising card reminder. The method may include the step of acquiring a plurality of device locations, the device locations being acquired at different instances in time and associated with a mobile device. The method may also include the step of calculating an overall merchant confidence rating based on the device locations over a predetermined period of time. Moreover, the method may include the step of determining whether the overall merchant confidence rating is greater than a first threshold. In response to determining that the overall merchant confidence rating is greater than or equal to a first threshold, the method may include the steps of acquiring a first merchant identifier associated with the merchant location; acquiring a set of available merchant identifiers from the financial service provider; and determining whether the first merchant identifier matches a merchant identifier in the set of available merchant identifiers, the first and set of available merchant identifiers being associated with a merchandising card of the user of the mobile device. Further, in response to determining that the first merchant identifier matches a second merchant identifier in the set of available merchant identifiers, the method may include the steps of sending a notification to the user of a mobile device indicating that the user is a holder of the associated merchandising card.

Consistent with certain disclosed embodiments, a system for managing a merchandising card reminder is provided. The system may include a memory storing instructions and one or more processors. The one or more processors may be configured to acquire from a device over a network, a plurality of device locations, the device locations being associated with a mobile device and being acquired at different instances in time. The one or more processors may also be configured to calculate an overall merchant confidence rating based on the device locations over a predetermined period of time. Further, the one or more processors may be configured to determine whether the overall merchant confidence rating is greater than a first threshold. If the overall merchant confidence rating is greater than or equal to a first threshold, the one or more processors may be configured to acquire a merchant identifier associated with the merchant location; acquire a set of available merchant identifiers from the financial service provider; and determine whether the first merchant identifier matches a merchant identifier in the set of available merchant identifiers, the first and set of available merchant identifiers being associated with a merchandising card of the user of the mobile device.

Furthermore, if the first merchant identifier matches a merchant identifier in the set of available merchant identifiers, the one or more processors may be configured to send a notification to the user of the mobile device indicating that the user is a holder of the associated merchandising card.

Aspects of the disclosed embodiments may also include a non-transitory tangible computer-readable medium that stores software instructions that, when executed by one or more processors, are configured for and capable of performing and executing one or more of the methods, operations, and the like consistent with disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
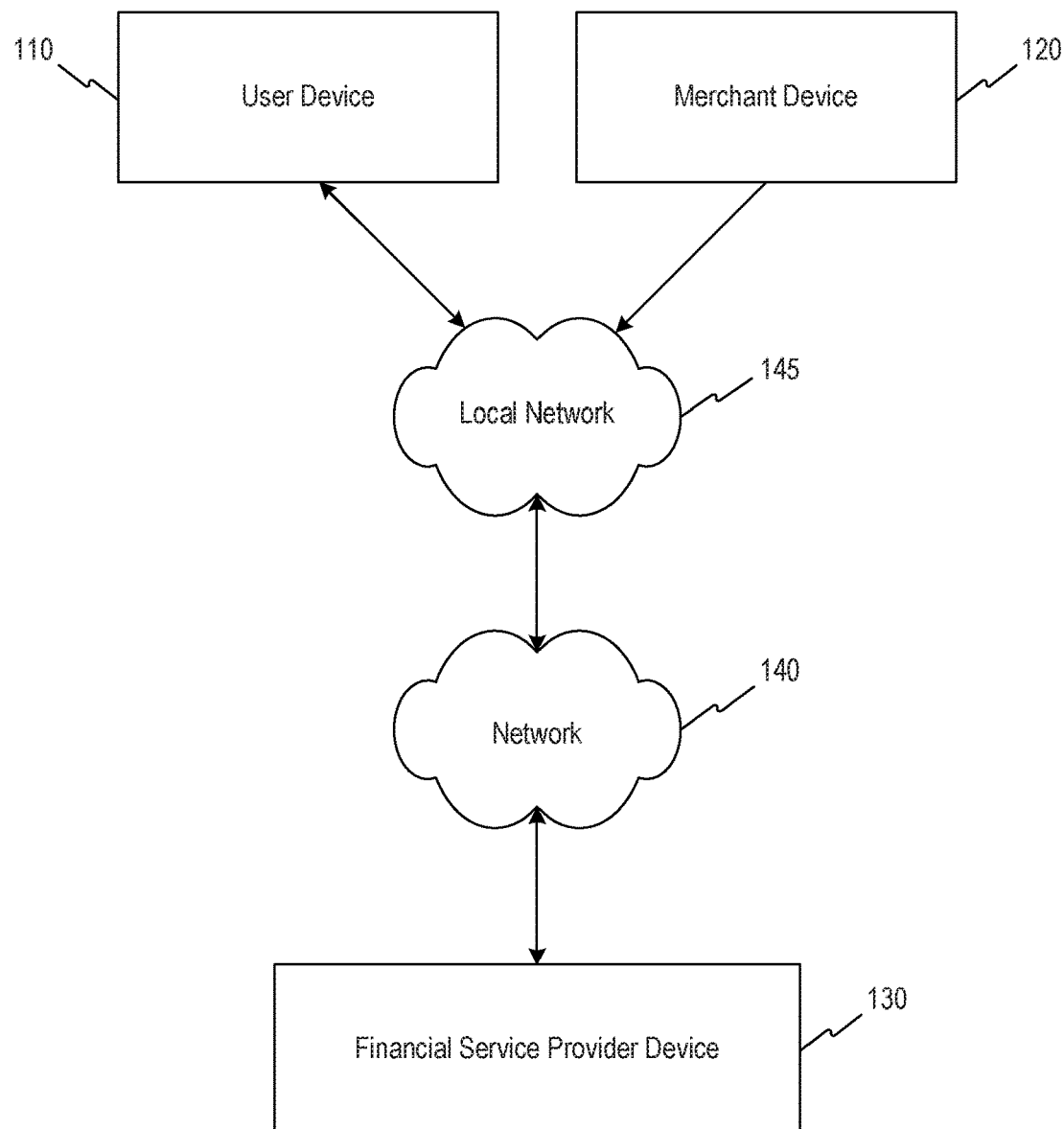
FIG. 1 is a block diagram of an exemplary card management system, consistent with disclosed embodiments.

Generally, the disclosed embodiments are directed to systems and methods for managing merchandising card reminders. In particular, the systems and methods may include techniques for managing merchandising card reminders associated with a financial account.

The term "merchandising card" may refer to a gift card, a loyalty card, a rewards card, a discount card, or the like. In addition, a merchandising card may be a physical merchandising card, a digital merchandising card, or both. In some embodiments, a merchandising card may be associated with a particular merchant, that is, a particular merchant may provide a merchandising card to a user (i.e., customer) for use in a merchandising program. A merchandising program may be one or a combination of a gift card program, a loyalty card program, a rewards program, a discount card program, a VIP program, or the like. A merchant may offer one or more users (i.e. customers) the opportunity to participate in one or more merchandising program. In some embodiments, the merchant may give a user a merchandising card as a way to participate in the merchandising program. In some embodiments, the merchandising card may be associated with a particular merchandising program.

A merchant may include any company, business, individual, or charity that conducts any type of transactions. For example, a merchant may be a retailer, a financial service provider, an automotive dealer, a software provider, or the like. In some embodiments, the merchant may sell an item or service from a merchant location. This merchant location may be a physical location (i.e., brick and mortar location) or a virtual (online) location. Moreover, in some other embodiments, a customer may be able to buy these items or services from the merchant by visiting the merchant location.

A user (i.e., customer) may be any entity that buys an item or service from a merchant. In some embodiments, a customer may sign-up to participate in a merchandising program that is associated with one or more particular merchants. To use and access the benefits of the merchandising program, a user may acquire a merchandising card from a merchant. In some embodiments, a user may use the merchandising card to buy goods or services from the merchant. A user may also use the merchandising card to collect points or redeemable credit to acquire rewards based on the terms of the merchandising program. Throughout this disclosure, the terms user, customer, and consumer may be used interchangeably.

In some embodiments, customers may also have the ability to upload their electronic or physical merchandising card to a card management system, such as a card management system associated with a financial service provider. In some embodiments, components of the card management system may be implemented in an application that is installed on a user's mobile device.

In certain embodiments, the card management system may acquire position information (e.g., via global positioning system (GPS) coordinates) from a customer's device over a network. In some embodiments, the card management system may be implemented by a financial service provider, a financial service provider device, a merchant device, a user device, or the like, or any combination thereof. The card management system, in some embodiments, may calculate a merchant confidence rating (e.g., high, medium, low, etc.) to determine whether the customer is located inside or in proximity to a physical location of a particular merchant from which the customer has received a merchandising card of that merchant. In some embodiments, if the card management system determines that the customer is located inside or in proximity to a physical location of a merchant and the customer has a merchandising card that is associated with that merchant, the card management system may send a notification to the customer's device to notify the customer concerning some aspect the merchandising card.

Reference will now be made in detail to exemplary embodiments, examples of which are illustrated in the accompanying drawings and disclosed herein. Wherever convenient, the same reference numbers will be used throughout the drawings to refer to the same or like parts.

FIG. 1 shows a block diagram of an exemplary card management system 100 for managing merchandising cards, consistent with disclosed embodiments. The components and arrangements shown in FIG. 1 are not intended to limit the disclosed embodiments, as the components used to implement the disclosed processes and features may vary.

In accordance with disclosed embodiments, card management system 100 may include a user device 110, a merchant device 120, a financial service provider device 130, a wide-area network (WAN) 140, and a local network 145. Other components known to one of ordinary skill in the art may be included in card management system 100 to gather, process, transmit, receive, acquire, and provide information used in conjunction with the disclosed embodiments. In addition, card management system 100 may further include other components that perform or assist in the performance of one or more processes that are consistent with disclosed embodiments.

In some embodiments, card management system 100 may include one or more user devices 110. A customer may operate user device 110, which may be a desktop computer, a laptop, a tablet, a smartphone, a multifunctional watch, a pair of multifunctional glasses, a tracking device, or any suitable device with computing capability. User device 110 may comprise a memory, a processor, and/or other specialized hardware that is configured to execute one or more methods of the disclosed embodiments. User device 110 may have an application installed thereon, which may enable user device 110 to communicate with merchant device 120 and/or financial service provider device 130 via WAN 140 and/or local network 145. Alternatively, user device 110 may connect to financial service provider device 130 and/or merchant device 120 through use of web browser software.

User device 110 may allow a user to access information stored in financial service provider device 130, such as, for example, financial information related to recent purchase transactions, financial discounts, financial statements, account information, merchandising program information, merchandising card information, and/or the like. User device 110 may also include a GPS unit (not pictured). In some embodiments, user device 110 may use the GPS unit to acquire and transmit the position information, such as the physical location of user device 110, to merchant device 120 and/or financial service provider device 130. An exemplary computer system consistent with user device 110 is discussed in additional detail with respect to FIG. 2.

A user may operate user device 110 to perform one or more operations consistent with disclosed embodiments. In one aspect, a user may be a customer of a financial service provider that may be associated with financial service provider device 130. For instance, a financial service provider may maintain a financial service account (e.g., credit card account) for the customer that the customer may use to purchase goods and/or services online or at brick-and-mortar locations associated with a merchant. In another aspect, a user may also be a customer of a merchant that is associated with merchant device 120. For instance, a user may operate user device 110 to initiate purchase transactions with a merchant via merchant device 120 and receive communications associated with a merchandising card. Additionally, in certain embodiments, a user may operate user device 110 to view a financial service account or financial statement provided by a financial service provider or financial service provider device 130.

Card management system 100 may also include one or more merchant devices 120. Merchant device 120 may be a computing system that is associated with a merchant or other business entity such as a retailer, a grocery store, a service provider (e.g., utilities, etc.), or any other type of entity that provides goods and/or services that customers may purchase. While card management system 100 is shown in FIG. 1 with one merchant device 120, the disclosed embodiments may be implemented in a system including two or more merchant devices 120 associated with any number of underlying business entities. Further, merchant device 120 is not limited to conducting business in any particular industry or field.

Merchant device 120 may be associated with a merchant brick-and-mortar location that a user may physically visit to purchase goods and/or services from a merchant. Such physical locations may include merchant devices 120, which may include computing devices that perform financial service transactions with customers (e.g., Point of Sale (POS) terminals, kiosks, etc.). Merchant device 120 may also include back- and/or front-end computing components that store data and execute software instructions to perform operations consistent with disclosed embodiments, such as computers that are operated by employees of the merchant (e.g., back-office systems, etc.). Merchant device 120 may also be associated with a merchant that provides goods and/or services via known online or e-commerce type of solutions. For example, such a merchant may sell goods via a website using known online or e-commerce systems and solutions to market, sell, and process online transactions.

In some embodiments, merchant device 120 may include one or more servers or other type of computing devices configured to execute software instructions stored in memory to perform one or more processes consistent with disclosed embodiments. For example, merchant device 120 may include one or more memory devices storing data and software instructions and one or more processors configured to use the data and execute the software instructions to perform server-based functions and operations known to those skilled in the art. In some embodiments, merchant device 120 may have an application installed thereon to perform one or more processes that are consistent with disclosed embodiments.

In certain embodiments, merchant device 120 may further include servers that are configured to execute stored software instructions to perform operations associated with a merchant, including processes associated with handling purchase transactions, generating transaction data, generating product data (e.g., SKU data) relating to purchase transactions, etc. Merchant device 120 may include one or more servers that may be a general-purpose computer, a mainframe computer, or any combination of these components. In certain embodiments, merchant device 120 (or a system including merchant device 120) may be configured as an apparatus, system, and the like based on the storage, execution, and/or implementation of the software instructions that perform one or more operations consistent with disclosed embodiments. Merchant device 120 may be standalone or part of a subsystem included in a larger system. For example, merchant device 120 may include distributed servers that are remotely located and communicate over a network (e.g., WAN 140 or local network 145. An exemplary computer system consistent with merchant device 120 is discussed in additional detail with respect to FIG. 2.

In some embodiments, card management system 100 may also include one or more financial service provider devices 130. Financial service provider device 130 may be a system associated with a financial service provider (not shown), such as a bank, a credit card company, a lender, brokerage firm, or any other type of financial service entity that generates, provides, manages, maintains financial service accounts, manages merchandising cards etc., for customers. Financial service provider device 130 may be one or more computing systems that are configured to execute software instructions stored on one or more memory devices to perform one or more operations consistent with disclosed embodiments. For example, financial service provider device 130 may include memory devices storing data and software instructions and processors configured to use the data and execute the software instructions to perform server-based functions and operations known to those skilled in the art. Financial service provider device 130 may include one or more general-purpose computers, mainframe computers, or any combination of these types of components. In some embodiments, financial service provider device 130 may have an application installed thereon to perform processes that are consistent with disclosed embodiments.

In certain embodiments, financial service provider device 130 may be configured as a particular apparatus, system, and the like based on the storage, execution, and/or implementation of the software instructions that perform operations consistent with disclosed embodiments. Financial service provider device 130 may be standalone, or it may be part of a subsystem included in a larger system. For example, financial service provider device 130 may include distributed servers that are remotely located and communicate over a network (e.g., WAN 140 and/or local network 145) or a dedicated network of a financial service provider. An exemplary computing system consistent with financial service provider device 130 is discussed in additional detail with respect to FIG. 2, below.

Financial service provider device 130 may include or may access one or more storage devices configured to store data and/or software instructions used by one or more processors of financial service provider device 130 to perform operations consistent with disclosed embodiments. For example, financial service provider device 130 may include memory configured to store one or more software programs that perform several functions when executed by a processor. The disclosed embodiments are not limited to separate programs or computers configured to perform dedicated tasks. For example, financial service provider device 130 may include memory that stores a single program or multiple programs. Additionally, financial service provider device 130 may execute one or more programs located remotely from financial service provider device 130. For example, financial service provider device 130 may access one or more remote programs stored in memory included with a remote component that, when executed, perform operations consistent with disclosed embodiments. In certain aspects, financial service provider device 130 may include server software that generates, maintains, and provides services associated with merchandising card management. In other aspects, financial service provider device 130 may connect separate servers or similar computing devices that generate, maintain, and provide services associated with financial data for a financial service provider associated with financial service provider device 130.

WAN 140 may comprise any computer networking arrangement used to exchange data. For example, WAN 140 may be the Internet, a private data network, a virtual private network (VPN) using a public network, and/or other suitable connections that enable the components of card management system 100 to send and acquire information. WAN 140 may also include a public switched telephone network ("PSTN") and/or a wireless network such as a cellular network, wired Wide Area Network, Wi-Fi network, or other known wireless network (e.g., WiMAX) capable of bidirectional data transmission.

Local network 145 may comprise any type of computer networking arrangement used to exchange data in a localized area, such as Wi-Fi based on IEEE 802.11 standards, Bluetooth™, Ethernet, and other suitable network protocols that enable components of card management system 100 to interact with one another and to connect to WAN 140 for interacting with components in system environment 100. In some embodiments, local network 145 comprises a portion of WAN 140. In other embodiments, components of card management system 100 may communicate via WAN 140 without a separate local network 145.

Figure 2:
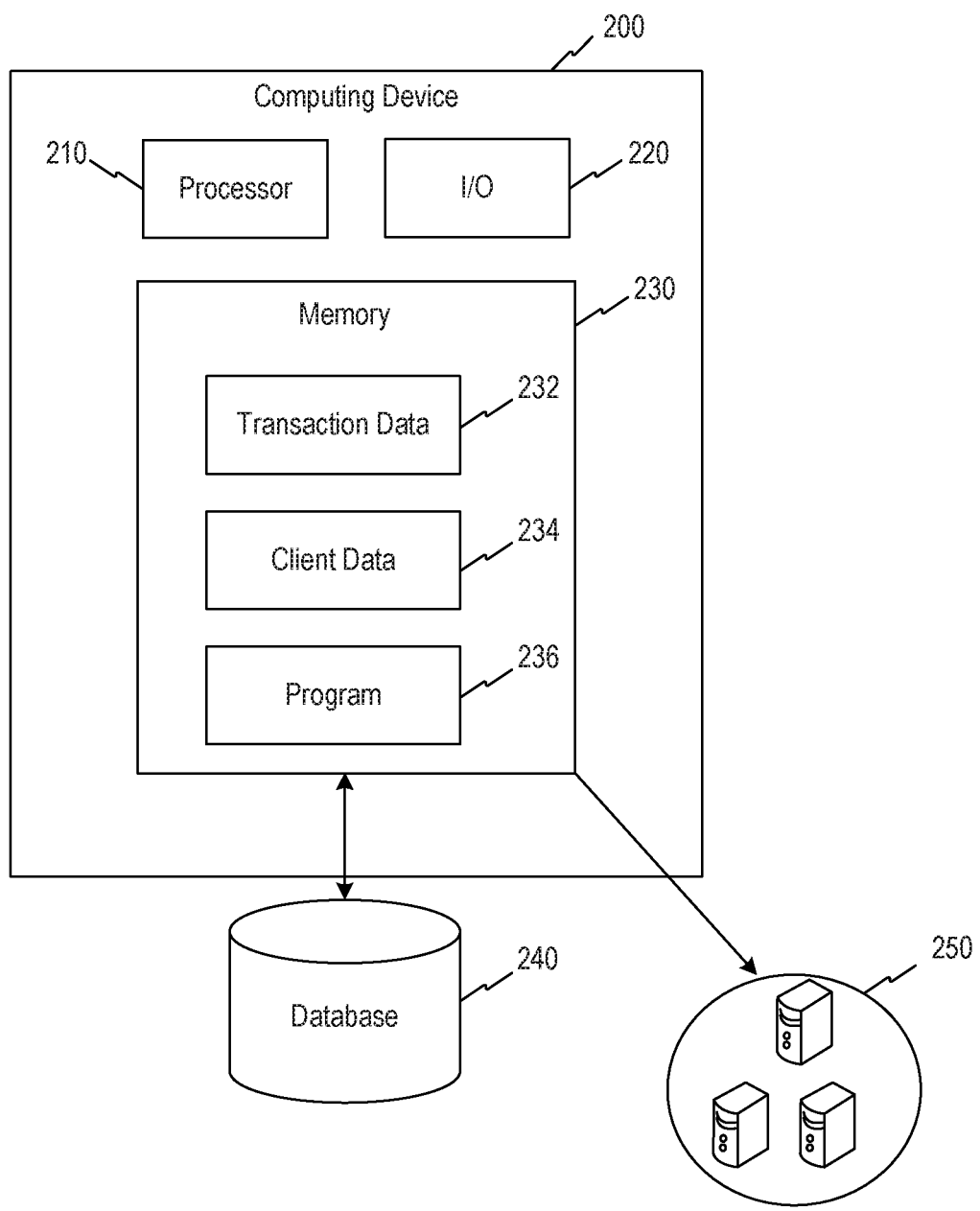
FIG. 2 is a block diagram of an exemplary computer system, consistent with disclosed embodiments.

FIG. 2 shows a block diagram of an exemplary computing system 200 illustrating a computing system configuration that may be associated with user device 110, merchant device 120, and/or financial service provider device 130, consistent with disclosed embodiments. In some embodiments, computing system 200 may have one or more processors 210, one or more input/output (I/O) devices 220, and/or one or more memories 230. In certain embodiments, computer system 200 may also be connected to a database 240 and/or a cloud service 250.

In some embodiments, computing system 200 may take the form of a server, a general-purpose computer, a mainframe computer, a laptop, a smartphone, a mobile device, or any combination of these components. In certain embodiments, computing system 200 (or a system including computing system 200) may be configured as a particular apparatus, system, and the like based on the storage, execution, and/or implementation of the software instructions that perform one or more operations consistent with disclosed embodiments. Computing system 200 may be standalone, or it may be part of a subsystem included in a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems or other manufacturers. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In certain embodiments, processor 210 may include a multiple-core processor arrangement (e.g., dual, quad-core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store data and instructions used by processor 210 to perform functions related to the disclosed embodiments. For example, memory 230 may be configured with software instructions, such as program 236 that may perform operations when executed by processor 210. The disclosed embodiments are not limited to separate programs or computers configured to perform dedicated tasks. For example, memory 230 may include a single program 236 that performs the functions of computing system 200, or program 236 could comprise multiple programs. Additionally, processor 210 may execute one or more programs located remotely from computing system 200. For example, user device 110, merchant device 120, and/or financial service provider device 130, may, via computing system 200 (or variants thereof), access one or more remote programs that, when executed, perform functions related to certain disclosed embodiments. Processor 210 may further execute one or more programs located in database 240 and/or cloud service 250. In some embodiments, program 236 may be stored in an external storage device, such as at cloud service 250 located outside of computing system 200, and processor 210 may execute program 236 remotely.

Programs 236 executed by processor 210 may cause processor 210 to execute one or more processes related to financial services provided to users including, but not limited to, processing credit and debit card transactions, checking transactions, funding deposits and withdrawals, transferring money between financial accounts, lending loans, processing payments for credit card and loan accounts, and managing merchandising cards, which includes managing merchandising card reminders.

I/O device 220 may be one or more devices configured to allow data to be acquired and/or transmitted by computing system 200. I/O device 220 may include one or more digital and/or analog communication devices that allow computing system 200 to communicate with other machines and devices, such as other components of card management system 100 shown in FIG. 1. For example, computing system 200 may include interface components that may provide interfaces to one or more input devices, such as keyboards, mouse devices, and the like, which may enable computing system 200 to acquire input from an operator of financial service device 130 (FIG. 1).

Memory 230 may also store data that may reflect any type of information in any format that the system may use to perform operations consistent with disclosed embodiments. Memory 230 may store instructions to enable processor 210 to execute one or more applications, such as server applications, a merchandising card management application, network communication processes, and any other type of application or software. Alternatively, the instructions, application programs, etc., may be stored in an external storage (not shown) in communication with computing system 200 via WAN 140 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to purchasing transactions initiated by a user. For example, transaction data may include a user identifier and a purchase price. The user identifier may be a credit or debit card number, an account number, or other means of identifying the user initiating the purchase transaction. The purchase price may include a number representing the total sale price of the purchase transaction and/or may include a list of the various items purchased from the merchant. In some embodiments, merchant device 120 may collect, generate, and provide transaction data relating to purchase transactions involving a user to financial service provider device 130. In some embodiments, merchant device 120 may further provide product data (e.g., SKU data) and transaction data relating to purchase transactions involving a user to financial service provider device 130. Merchant device 120 may provide this information to financial service provider device 130 via WAN 140. In some embodiments, transaction data 232 may be stored in database 240 and/or cloud service 250 or in an external storage (not shown) in communication with computing system 200 via WAN 140 or any other suitable network.

Memory 230 may further include client data 234. Client data 234 may include information about particular customers of the financial service provider. For example, client data 234 may include customers' account information, debit or credit card information, history of purchase transactions, financial statements, credit score, risk profile, and/or merchandising card data. Client data 234 may further contain one or more user profiles associating the account information, debit or credit card information, history of purchase transactions, financial statements, credit score, risk profile, and/or merchandising card information, including stored merchandising cards. When a user initiates a purchase transaction, processor 210 may analyze client data 234 or user profiles before authorizing the purchase transaction on behalf of a user. In some embodiments, client data 234 may be stored in database 240 and/or cloud service 250 or in an external storage (not shown) in communication with computing system 200 via WAN 140 or any other suitable network.

Processor 210 may analyze transaction data 232 in reference to client data 234. For example, processor 210 may analyze transaction data to determine which client with information stored in client information 234 is initiating the purchase transaction. Processor 210 may access the particular user's client information to determine their account information, debit or credit card information, history of purchase transactions, financial statements, credit score, risk profile, and/or merchandising card information.

Computing system 200 may also contain one or more databases 240. In some embodiments, computing system 200 may be communicatively connected to database 240 through WAN 140 and/or local network 145. Database 240 may include one or more memory devices that store information and are accessed and/or managed through computing system 200. By way of example, database 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to acquire and process requests for data stored in memory devices of database(s) 240 and to provide data from database 240.

Computing system 200 may be communicatively connected to one or more cloud service(s) 250. In some embodiments, computing system 200 may be communicatively connected to cloud service 250 through WAN 140 and/or local network 145. Cloud service 250 may include a physical and/or virtual storage system associated with cloud storage for storing data and providing access to data via a public network 145, such as the Internet. Cloud service 250 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via WAN 140. In some embodiments, cloud service 250 comprises multiple computer systems spanning multiple locations and having multiple databases or multiple geographic locations associated with a single or multiple cloud storage service(s). As used herein, cloud service 250 refers to physical and virtual infrastructure associated with a single cloud storage service and may manage and/or store data associated with managing merchandising card reminders.

As discussed above, financial service device 130 may include at least one computing system 200. Further, it should be understood that variations of computing system 200 may be used by other components of card management system 100, including merchant device 120 and user device 110. In some embodiments, computing system 200 may be a single server or may be configured as a distributed computer system including multiple servers or computers that interoperate to perform one or more of the processes and functionalities associated with the disclosed embodiments.

Figure 3:
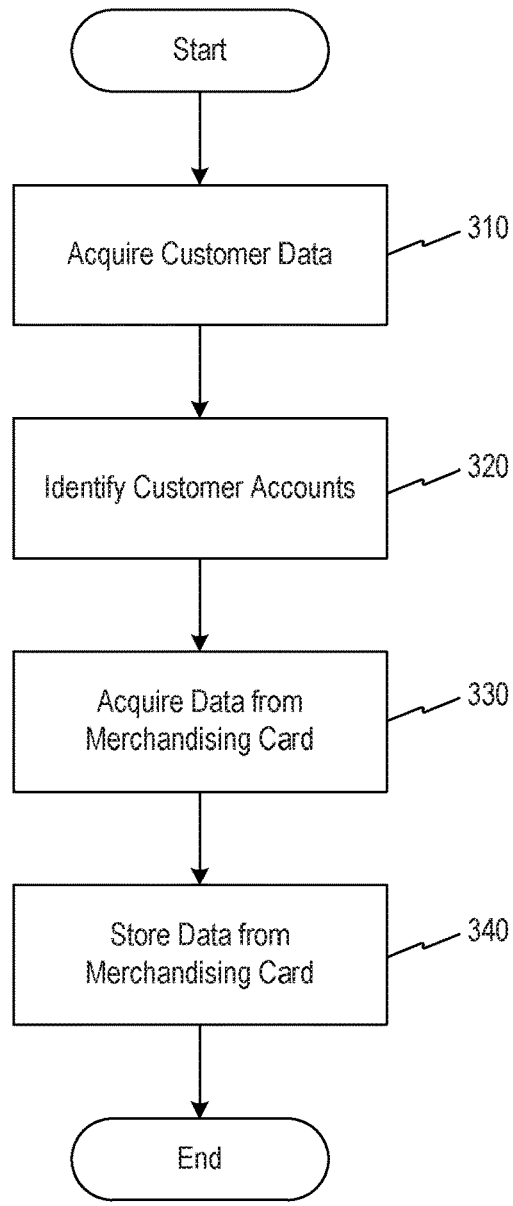
FIG. 3 is a flowchart of an exemplary process for managing merchandising cards, consistent with disclosed embodiments.

FIG. 3 shows an exemplary process for managing merchandising cards, consistent with disclosed embodiments. In some embodiments, processor 210 of, for example, financial service provider device 130 will execute instructions encoded on a computer-readable storage medium to perform steps of the process for managing merchandising cards described by FIG. 3. It should also be understood, however, that one or more steps of process 300 may be implemented by other components of card management system 100 (shown or not shown), including merchant device 120 and/or user device 110.

At step 310, financial service provider device 130 may acquire user data relating to a customer of a financial service provider. In some embodiments, financial service provider device 130 may acquire user data over WAN 140 from, for example, user device 110. User data may be entered manually by the user into user device 110 by typing it on a keyboard or other input device (not shown). User data may also be entered automatically, for example, by scanning or swiping a credit or debit card on user device 110 or merchant device 120, which may contain user data pertaining to the user or by taking a picture of a credit or debit card using an application that may be installed on user device 110 or merchant device 120.

Financial service provider device 130 may use the user data to identify one or more customer accounts associated with the user (step 320). For example, financial service provider device 130 may compare user data acquired from user device 110 or merchant device 120 with client data 234 to identify one or more customer accounts associated with the user (using, e.g., a financial account identifier indicated in the user data).

At step 330, financial service provider device 130 may acquire merchandising card data associated with one or more merchandising cards owned or held by a user. In some embodiments, merchandising card data may include, for example, a merchant identifier identifying the merchant at which the merchandising card is redeemable and a value identifying the amount of credit on the merchandising card. In some embodiments, merchandising card data may include, for example, a number of points or value awarded, a number of points or value earned, a maximum or a minimum number of points or value that the merchandising card can hold, an expiration date that indicates when the number of points earned or awarded will expire, etc. Merchandising card data may, alternatively or additionally, include a merchandising card identifier number, a serial number identifying the particular merchandising card for which data has been acquired, etc. In some embodiments, merchandising card data may be stored and associated with stored merchant identifiers. Merchant identifiers may include merchant names, merchant codes, merchant category codes, ticker symbols, or the like. In addition, merchant identifiers may be stored in database 240 and/or cloud service 250. Merchant identifiers may be stored separately or with other merchandising card data.

Merchandising card data may be acquired by financial service provider device 130 from, for example, user device 110 and/or merchant device 120. For example, merchandising card data may be entered manually by the user into user device 110 by typing it on a keyboard or other input device (not shown). Merchandising card data may also be entered automatically, for example, by scanning or swiping the merchandising card on user device 110 or merchant device 120, or by taking a picture of the merchandising card using an application that may be installed on user device 110.

Financial service provider device 130 may store acquired merchandising card data in memory 230 (step 340). For example, financial service provider device 130 may store the acquired merchandising card data in client data 234, in relation to the account identified in step 320. Additionally or alternatively, financial service provider device 130 may store the acquired merchandising card data in database 240 and/or cloud service 250. Financial service provider device 130 may associate merchandising card data stored in database 240 and/or cloud service 250 with the customer account identified in step 320. Associating the acquired merchandising card data with the customer account identified in step 230 may be accomplished, for example, by linking the merchandising card data with the customer account or by creating a subcategory of memory within the customer account for storing merchandising card data such as that acquired by financial service provider device 130 in step 330.

Figure 4:
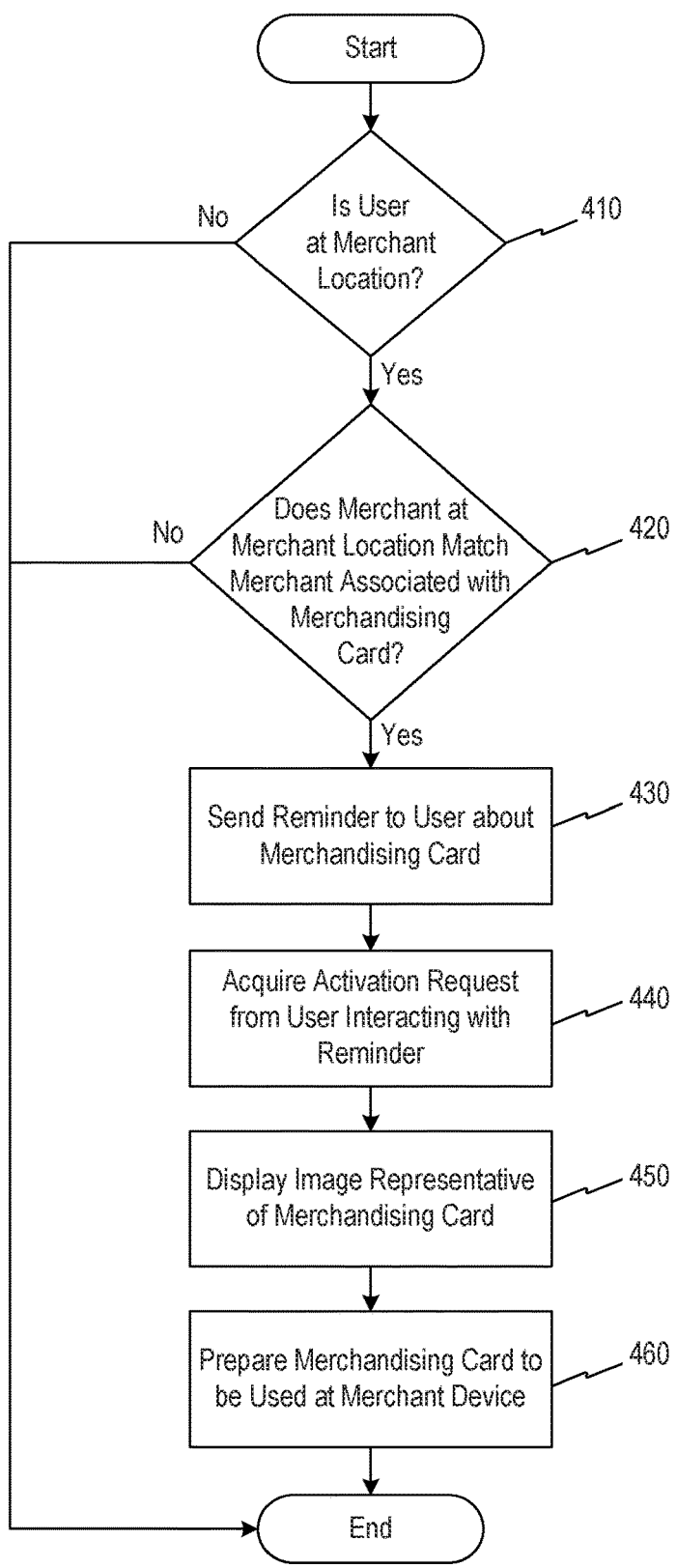
FIG. 4 is a flowchart of an exemplary process for managing merchandising card reminders associated with a merchandising card, consistent with disclosed embodiments.

FIG. 4 shows an exemplary process for managing merchandising card reminders associated with a financial account, consistent with disclosed embodiments. At step 410, financial service provider device 130 may determine whether the user is located at a merchant location. In some embodiments, financial service provider device 130 may acquire a notification from merchant device 120 when the user presents a credit card associated with a financial service provider and/or financial service device 130 for payment via merchant device 120. In some instances, the notification may occur automatically as a result of detection of the proximity of user device 110 to the merchant location. In certain embodiments, merchant device 120 may include one or more servers that host a website. Thus, merchant device 120 may send a notification, indicating that the user is located at a merchant location, to financial service provider device 130 when user device 110 sends a request to merchant device 120 via the website.

In certain embodiments, financial service provider device 130 may acquire a notification from user device 110 when the user of user device 110 has manually sent a notification (e.g., via a text, voice, email, social media message, interaction or gesture transmitted from a user to user device 110, etc.) to financial service provider device 130 that the customer is at the merchant location. In certain embodiments, financial service provider device 130 may determine that a user is located at a merchant by determining that a merchandising card, which may be associated with the user and financial service provider device 130, is swiped or used for payment at merchant device 120. In some embodiments, step 410 may be implemented using a process similar to the one in FIG. 5, consistent with disclosed embodiments.

Figure 5:
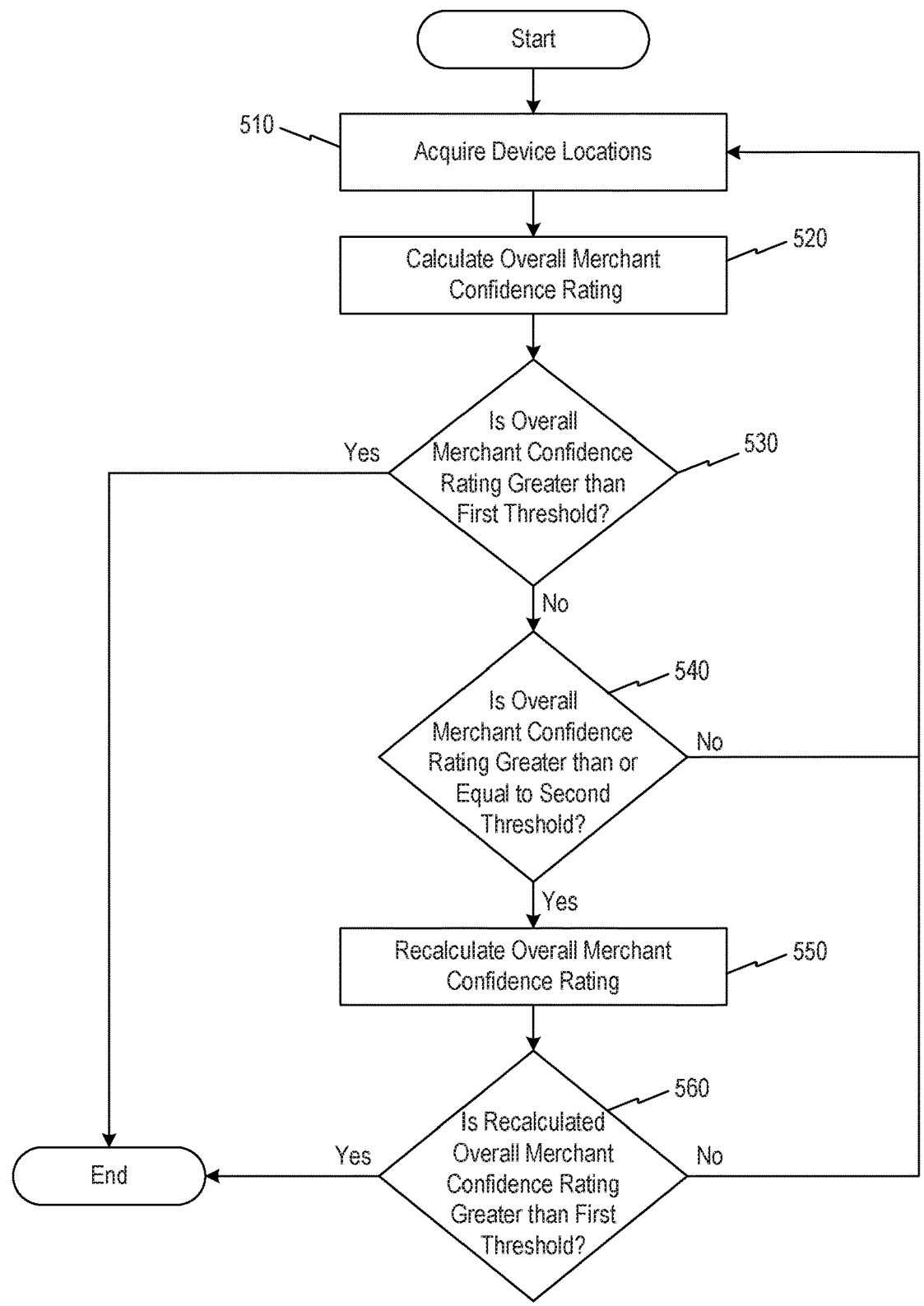
FIG. 5 is a flowchart of an exemplary process for determining whether a user is located at a merchant location, consistent with disclosed embodiments.

In accordance with FIG. 5, at step 510, financial service provider device 130 may acquire one or more locations associated with user device 110 (i.e., device locations) over WAN 140 and/or local network 145. In some embodiments, financial service provider device 130 may acquire the device locations in the form of GPS coordinates from a GPS unit, such as a GPS unit within user device 110. In some of these embodiments, an application installed in user device 110 may use a GPS function on user device 110 to transmit, via WAN 140 and/or local network 145, GPS coordinates to financial service provider device 130. Financial service provider device 130 may acquire the locations at different instances in time within a predetermined period of time. For example, financial service provider device 130 may acquire a set of GPS coordinates at five-second intervals for five minutes, or, as another example, acquire a set of GPS coordinates at random intervals over a random period of time based on a randomized equation. One of ordinary skill in the art would understand that there are multiple configurations that financial service provider device 130 may use to acquire one or more device locations at different instances in time within a predetermined period of time.

At step 520, financial service provider device 130 may calculate an overall merchant confidence rating. An overall merchant confidence rating may be represented in multiple ways. For example, an overall merchant confidence rating may be represented by one or more numbers, symbols, words, or the like, or any combination thereof, as well as by indicators, such as "low," "medium," "high," or the like.

In some embodiments, financial service provider device 130 may calculate an overall merchant confidence rating based on computing one or more individual merchant confidence ratings. In some embodiments, the overall merchant confidence rating and/or one or more individual merchant confidence ratings may be determined based on computing the ratings during a predetermined period of time. In some embodiments, financial service provider device 130 may implement step 520 using a process shown in FIG. 6, consistent with disclosed embodiments.

Figure 6:
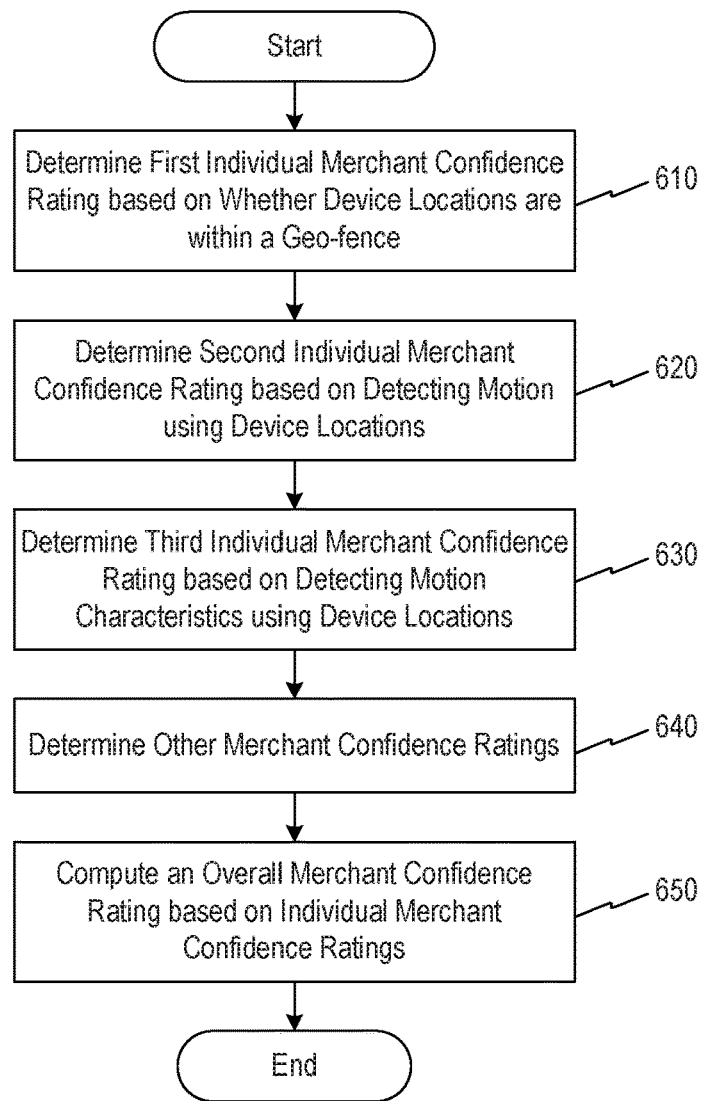
FIG. 6 is a flowchart of an exemplary process for computing a merchant confidence rating, consistent with disclosed embodiments.

In FIG. 6, at step 610, financial service provider device 130 may determine a first individual merchant confidence rating that may be based on whether the user device locations are within a geofence. For example, financial service provider device 130 may determine a geofence, that is, one or more vertices and/or points surrounding a geographic area, that is associated with a merchant location. In certain embodiments, financial service provider device 130 may look up coordinates by using one or more device locations (acquired in step 510), database 240, and/or cloud service 250. For example, financial service provider device 130 may look up vertices that define the boundary of a geofence associated with a merchant location; points that define the boundary of a geofence associated with a merchant location; an equation that defines the boundary of a geofence associated with a merchant location; or the like; or any combination thereof. In certain embodiments, financial service provider device 130 may determine a geofence that is associated with a merchant location by using an application programmable interface (API).

After financial service provider device 130 has determined a geofence that is associated with a merchant location, financial service provider device 130 may then determine whether the device locations (acquired in step 510) associated with user device 110 are within the geofence. In some embodiments, financial service provider device 130 may not require all the device locations to be within the geofence, but may require only that a predetermined number or percentage of the device locations are within the geofence. In some embodiments, if less than a predetermined number or percentage of the device locations are within the geofence, financial service provider device 130 may acquire additional device locations. In some embodiments, the financial service provider may determine a higher first individual merchant confidence rating based on detecting that user device 110 has been in the geofence for a longer predetermined period of time.

In certain embodiments, financial service provider device 130 may determine that the first individual merchant confidence rating is directly proportional to the number of device locations within the geofence. In other words, financial service provider device 130 may determine a higher merchant confidence rating based on a higher number of device locations existing within the geofence. In some embodiments, financial service provider device 130 provider may determine, for example, that if the device locations are less than the predetermined number or percentage of the device locations, then the first individual merchant confidence rating is lower than a different first individual merchant confidence rating determined when the device locations are greater than or equal to the predetermined number or percentage of the device locations.

At step 620, financial service provider device 130 may determine a second individual merchant confidence rating that is based on detecting motion of user device 110 using, for example, device locations. For example, financial service provider device 130 may detect a motion of user device 110 by determining that a displacement exists between at least two of the device locations. In some embodiments, financial service provider device 130 may only detect motion when the displacement is above a predetermined threshold.

In certain embodiments, financial service provider device 130 may determine a higher second individual merchant confidence rating if the detected motion or the displacement between two or more consecutive (i.e., consecutively acquired in time) device locations are below a predetermined threshold. If the displacement is high or large, then financial service provider device 130 may determine that the user has moved too far to be within a particular merchant location. For example, if the displacement between device locations is 50 yards, then it is unlikely that the user is actually inside or in proximity to a merchant location of a small retailer on a block in New York City, N.Y. However, if the merchant is a football team and the merchant location is a football stadium, financial service provider device 130 may determine a higher second merchant confidence rating even if the displace of a user is 50 yards (described with the understanding that a football field is normally at least 100 yards). Therefore, the second merchant confidence rating may be based on not only the motion of user device 110 but also the type of merchant and/or known details about the particular merchant location or surrounding the merchant location (e.g., perimeter of the location, shape of the location, area of the location, size of the location, etc.).

In some embodiments, financial service provider device 130 may determine a confidence rating only when there is little to no displacement between successive location determinations; in other words, financial service provider device 130 may detect a stop. Financial service provider device 130, in some embodiments, may determine a higher second individual merchant confidence rating based on detecting that user device 110 has been stopped for a longer predetermined period of time.

In certain embodiments, financial service provider device 130 may determine a higher second individual merchant confidence rating if the detected motion or the displacement between consecutive device locations is representative of a predetermined shopping pattern. For example, financial service provider device 130 may determine that a user would typically move around within a merchant location (e.g., grocery store) in a predetermined shopping pattern or manner (e.g., fruits and vegetables aisle first, frozen foods aisle second, etc.), so financial service provider device 130 may determine a second merchant rating that is directly proportional to similarity of a pattern defined by the device locations to a predetermined shopping pattern. For example, financial service provider device 130 may determine a higher second individual merchant confidence rating if the device locations pattern is very similar to the predetermined shopping pattern.

At step 630, financial service provider device 130 may determine a third individual merchant confidence rating that is based on detecting a motion characteristic of user device 110. A motion characteristic may include speed, acceleration, rotational speed, rotational acceleration, momentum, force, or the like that could be calculated using the device locations, the mass of the device, time, etc., by one of ordinary skill in the art.

In some embodiments, financial service provider device 130 may detect the motion characteristic of user device 110 using device locations (acquired in step 510). For example, financial service provider device 130 may detect a motion characteristic of user device 110 by determining that there is a displacement between at least two of the device locations over a certain time period. In some embodiments, financial service provider device 130 may only detect a motion characteristic when the displacement is above a predetermined threshold. In some embodiments, financial service provider device 130 may determine a higher third individual merchant confidence rating based on detecting that user device 110 has a little to none of a motion characteristic (e.g., similar to detecting a stop) for a predetermined period of time.

In certain embodiments, financial service provider device 130 may determine a higher third individual merchant confidence rating if the detected a motion characteristic is below a predetermined threshold. For example, using speed as the motion characteristic, financial service provider device 130 may determine that speeds above regular walking and/or running speeds indicate that a user is not inside or in proximity to a merchant location. Instead, financial service provider device 130 may determine that the user or device is inside of a vehicle, such as an automobile, airplane, or the like. In some embodiments, financial service provider device 130 may determine the third individual merchant confidence rating based on not only the device location but also on the particular merchant or merchant location. For example, if the merchant is an airline company, financial service provider device 130 may determine that a higher speed is associated with a high merchant confidence rating or may disregard the speed because financial service provider device 130 may determine that the user is in an airplane belonging to the merchant. In some embodiment, however, if the merchant is a grocery store, financial service provider device 130 may determine a lower speed (e.g., normal walking/running speed) is associated with a higher merchant confidence rating.

Similar to step 620, financial service provider device 130 may determine a higher third individual merchant confidence rating if the detected motion characteristics are representative of predetermined shopping motion characteristics. For example, using speed as the motion characteristic, financial service provider device 130 may determine that a user would typically move around a merchant (e.g., car wash) at a predetermined speed (e.g., five minutes to wash, ten minutes to wax, two minutes to dry, etc.), so financial service provider device 130 may determine a third merchant rating that is directly proportional to closeness of a speed that the device locations of user device 110 creates and the predetermined shopping speed. For example, financial service provider device 130 may determine a higher third individual merchant confidence rating if the speed that the device locations create matches the predetermined shopping speed more closely.

At step 640, financial service provider device 130 may determine additional individual merchant confidence ratings. In some embodiments, financial service provider device 130 may determine an individual merchant confidence rating based on detecting a significant change in location using the device locations. In some embodiments, financial service provider device 130 may determine an individual merchant confidence rating that is higher if the device locations have not changed significantly or are within a predetermined range of each other. Financial service provider device 130 may determine that a user has left a location if there is a significant change or if one or more of the device locations are not within a predetermined range of the other device locations.

Moreover, in some embodiments, financial service provider device 130 may determine an individual merchant confidence rating based on other factors not associated with the device locations. For example, in some embodiments, financial service provider device 130 may determine an individual merchant confidence rating based on whether a user device 110 is connected to a local network 145 that is associated with a merchant location. For example, financial service provider device 130 may cause user device 110 to send the name of local network 145 (e.g., a Wi-Fi SSID, or the like) that is connected to user device 110. Financial service provider device 130 may then use database 240 and/or cloud service 250 to look up one or more names of the networks associated with a merchant location and determine if the name of local network 145 acquired from user device 110 matches one of the one or more names of the networks associated with the merchant location. In some embodiments, if the name of local network 145 acquired from user device 110 matches one of the one or more names of the networks associated with the merchant location, financial service provider device 130 may determine a higher individual merchant confidence rating than if the merchant confidence ratings did not match. Moreover, in some embodiments where financial service provider device 130 determines that the name of local network 145 acquired from user device 110 matches one of the one or more names of the networks associated with the merchant location, financial service provider device 130 may determine a higher merchant confidence rating if the name of local network 145 acquired from user device 110 matches a particular name of a network that is associated with the merchant location. For example, the one or more names of the networks associated with the merchant location may be ranked by, for example, signal strength and/or frequency of use, so financial service provider device 130 may determine a higher merchant confidence rating if the name of local network 145 acquired from user device 110 matches a higher ranked name of a network that is associated with the merchant location.

At step 650, financial service provider device 130 may calculate an overall merchant confidence rating based on one or more of the individual merchant confidence ratings. In certain embodiments, financial service provider device 130 may use one or more individual merchant confidence ratings and one or more formulas, comparisons, or the like, or any combination thereof to calculate the overall merchant confidence rating. For example, financial service provider device 130 may input two or more individual merchant confidence ratings into a weighted average formula to calculate the overall merchant confidence rating. As another example, financial service provider device 130 may normalize the individual merchant confidence ratings to calculate the overall merchant confidence rating. Even further, as another example, financial service provider device 130 may compare two or more individual merchant confidence ratings in a particular order and/or a particular way to calculate the overall confidence ratings. In certain embodiments, financial service provider device 130 may use an API to calculate the overall merchant confidence rating and/or the individual merchant confidence ratings.

Returning now to FIG. 5, at 530, financial service provider device 130 may determine whether the overall merchant confidence rating is greater than or equal to a first predetermined threshold. For example, in some embodiments, the first predetermined threshold may be a medium or high rating. In some embodiments, if financial service provider device 130 determines that the overall merchant confidence rating is not greater than or equal to the first predetermined threshold, then financial service provider device 130 may determine whether the overall merchant confidence rating is greater than or equal to a second predetermined threshold (at step 540). For example, in some embodiments, the second predetermined threshold may be a low or medium rating. In some embodiments, if financial service provider device 130 determines that the overall merchant confidence rating is not greater than or equal to the first predetermined threshold, financial service provider may start over and acquire more device locations (at step 510) or determine that the user is not at the merchant (step 410: no).

In some embodiments, if financial service provider device 130 determines that the overall merchant confidence rating is greater than or equal to the first predetermined threshold (step 540: yes), financial service provider device 130 may recalculate the overall merchant confidence rating using a different set of individual merchant confidence ratings (steps 610-650). In certain embodiments, financial service provider device 130 may, alternatively or additionally, use other methods (not discussed in steps 610-650) to recalculate the overall merchant confidence rating. For example, financial service provider device 130 may use historical hit-or-miss (success or failure) rates associated with past determinations of whether a device was at a merchant location and/or other data points (e.g., merchant, merchant location, type of user device, and other parameters associated with the user and/or merchant environment) to recalculate the merchant confidence rating using machine learning. In certain embodiments, financial service provider device 130 may use the historic hit-or-miss rates and/or other data to train a confidence (i.e., classification) model for machine learning. In some embodiments, financial service provider device 130 may calculate a higher overall confidence rating if there are more hits associated with the second predetermined threshold and/or other data points. The various ways of determining overall and/or individual confidence ratings, as described above, are only illustrative. One of ordinary skill in the art may use other techniques to determine overall and/or individual confidence ratings.

In some embodiments, once the second merchant confidence rating is recalculated, financial service provider device 130 may determine, in some embodiments, if the recalculated overall merchant confidence rating is greater than the first predetermined threshold (at step 560). If financial service provider device 130 determines that the recalculated overall merchant confidence rating is not greater than the first predetermined threshold (step 560: no), financial service provider device 130 may, in some embodiments, start over and acquire more device locations (at step 510) or determine that the user is not at the merchant (step 410: no). On the other hand, in some embodiments, if financial service provider device 130 determines that the recalculated overall merchant confidence rating is greater than the first predetermined threshold, financial service provider device 130 may determine that the user is at the merchant (step 410: yes).

Returning now to FIG. 4, if financial service provider device 130 determines that the user is located at a merchant location, at step 420, financial service provider device 130 may determine whether a merchant, associated with the merchant location where the user is located, matches a merchant that is associated with a merchandising card (e.g., acquired in step 330 and stored in step 340). In some embodiments, financial service provider device 130 may execute a process of FIG. 7 to determine whether a merchant, associated with the merchant location where the user is located, matches a merchant that is associated with a merchandising card.

Figure 7:
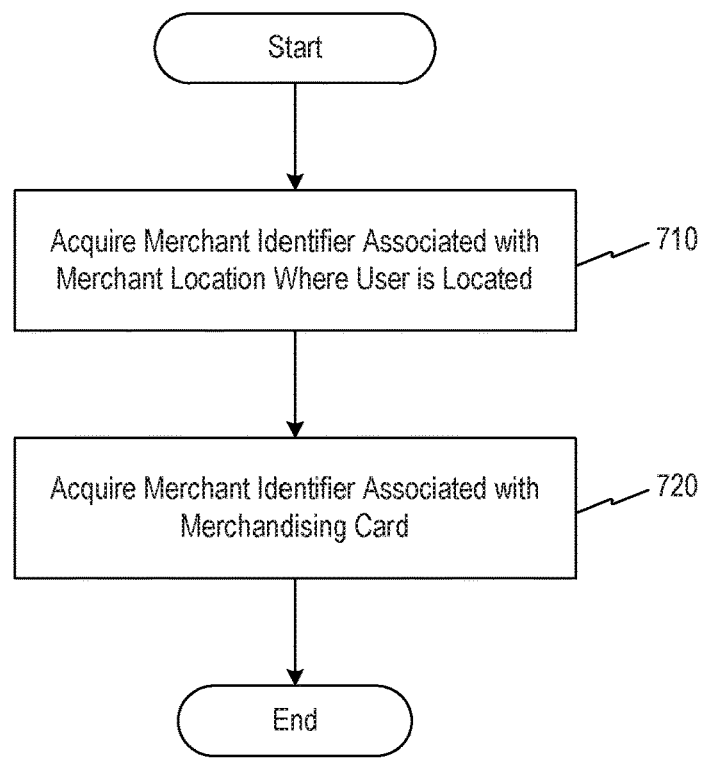
FIG. 7 is a flowchart of an exemplary process for determining whether a merchant, associated with a merchant location where the user is located, matches a merchant that is associated with a merchandising card, consistent with disclosed embodiments.

In accordance with FIG. 7, at step 710, financial service provider device 130 may acquire one or more merchant identifiers (e.g., merchant names) that are associated with a merchant location where the user is located. For example, financial service provider device 130 may acquire a merchant identifier that is associated with a merchant location where the user is located by using an API, database 240, cloud service 250, outside resource, and/or one or more of the device locations.

At step 720, financial service provider device 130 may acquire one or more merchant identifiers that are associated with a merchandising card. For example, financial service provider device 130 may acquire a merchant identifier that is associated with a merchandising card from an API, database 240, cloud service 250, outside resource, and/or one or more of the device locations.

Returning again to FIG. 4, in some embodiments, at step 420, financial service provider device 130 may determine whether the merchant identifier (acquired at step 710) matches or is associated with the merchant identifier (acquired at step 720). In some embodiments, if financial service provider device 130 determines that the merchant identifier acquired at step 710 matches or is associated with the merchant identifier acquired at step 720, financial service provider device 130 may determine that a merchant associated with the merchant location where the user is located, matches a merchant that is associated with a merchandising card (step 420: yes).

At step 430, financial service provider device 130 may send a reminder (i.e., notification) to user device 110. The reminder may indicate information associated with the merchandising card, user, financial service provider, merchant, user device 110, merchant device 120, financial service provider device 130, or the like.

In some embodiments, financial service provider device 130 may send a reminder using a text, email, voice, push notification, social media message, or the like. The reminder may, in certain embodiments, include a message indicating that the user is a holder of a merchandising card associated with the merchant and/or merchant location. In some embodiments, financial service provider device 130 may cause user device 110 to display a reminder. The displayed reminder may include an image representative of a merchandising card. In some embodiments, the displayed reminder may include images representing the front, bank, and/or side of the merchandising card. The images may be acquired, for example, from an API, database 240, an outside resource, and/or cloud service 250. In some embodiments, financial service provider device 130 may provide to user 110, and/or cause user device 110 to display, a link associated with a merchandising card.

At step 440, financial service provider device 130 may acquire an activation request from a user interacting with the reminder. In some embodiments, financial service provider device 130 may acquire an activation request when there is an interaction with or a selection of the link. An interaction may include, for example, any gesture that can be detected by user device 110 to communicate with user device 110. A gesture may include, for example, a touch, tap, click, wave, press, sound, movement of a body part, or the like.

At step 450, financial service provider device 130 may display an image representing the front, bank, and/or side of the merchandising card. For example, in some embodiments, financial service provider device 130 may cause user device 110 to display the image. At step 460, financial service provider device 130 may prepare the merchandising card to be used at merchant device 120. For example, financial service provider device 130 may cause user device 110 to prepare the merchandising card to be used at merchant device 120 by, for example, causing user device 110 to transmit data associated with merchandising card to merchant device 120 (e.g., via a near-field communication, radio frequency identification, magnetic secure transmission, WAN 140, local network 145, etc.)

It should be understood that, although FIGS. 4-7 are described as being performed by financial service provider device 130, one or more other components of system 100 may perform any or all steps of FIG. 4-7. For example, the steps may be performed exclusively or in combination with an application installed on user device 110, merchant device 120, and/or financial service provider device 130.

In some embodiments, some or all of the logic for the above-described techniques may be implemented as a computer program or application or as a plug-in module or sub-component of another application. The described techniques may be varied and are not limited to the examples or descriptions provided. In some examples applications may be developed for download to mobile communications and computing devices, e.g., laptops, mobile computers, tablet computers, smartphones, etc., being made available for download by the customer either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity generating, providing, managing, and/or maintaining the merchandising card management program for one or more customers, it is to be understood that, consistent with disclosed embodiments, another entity may provide such services in conjunction with or separate from a financial service provider.

The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A system for managing a merchandising card reminder, the system comprising:
    a memory storing instructions; and
    a processor configured to execute instructions to perform operations comprising:
        acquire a plurality of device locations over a network, the device locations being acquired at different instances in time and associated with a mobile device, wherein the plurality of device locations are determined based one of the mobile device's global positioning system (GPS) or network information;
        determine an overall merchant confidence rating based on the acquired device locations over a predetermined period of time, the overall merchant confidence rating comprising a weighted average of a first merchant confidence rating and a second merchant confidence rating, the first merchant confidence rating being based on the acquired device locations over a first predetermined period of time and the second merchant confidence rating being based on the acquired device locations over a second predetermined period of time;
        determine the second merchant confidence rating based on at least one of:
            a detected motion in the acquired device locations over the second predetermined period of time, the detected motion represents of a predetermined pattern of movement,
            a detected motion characteristic in the acquired device locations over the second predetermined period of time, wherein the detected motion characteristic includes at least one of a speed, acceleration, rotational speed, rotational acceleration, momentum, or force, or
            a determination that a displacement between a first acquired device location and a second acquired device location is not within a predetermined range over the second predetermined period of time;
        determine whether the overall merchant confidence rating is greater than a first threshold; and
        if the overall merchant confidence rating is greater than or equal to the first threshold:
            acquire a first merchant identifier associated with a first merchant location based on the determined overall merchant confidence rating;
            acquire, from a financial service provider, a set of available merchant identifiers associated with one or more merchandising cards of a user of the mobile device;
            determine whether the first merchant identifier matches a merchant identifier in the set of available merchant identifiers; and
            if the first merchant identifier matches a merchant identifier in the set of available merchant identifiers:
                send a notification to the mobile device indicating that the user is a holder of a merchandising card associated with the matched first merchant identifier, wherein the notification is configured to receive a user interaction that causes the mobile device to prepare the merchandizing card for use at the first merchant location.

2. The system of claim 1, wherein the processor is further configured to execute instructions to:
    determine the overall merchant confidence rating using an application programmable interface (API).

3. The system of claim 1, wherein the first merchant confidence rating is determined by determining a geofence associated with the merchant location; and
    determining whether a percentage of the acquired device locations are within the geofence for the first predetermined period of time.

4. The system of claim 1, wherein the processor is further configured to execute instructions to:
    determine a displacement between two consecutively acquired device locations over the first predetermined period of time; and
    determine the first merchant confidence rating based on the determined displacement relative to a second threshold.

5. The system of claim 4, wherein the second threshold is based on a value associated with the merchant location.

6. The system of claim 4, wherein the processor is further configured to execute instructions to:
    detect that the mobile device has stopped based on whether the determined displacement is below a third threshold.

7. The system of claim 1, wherein the processor is further configured to execute instructions to:
    determine a displacement between two of the acquired device locations over the first predetermined period of time; and
    determine the first merchant confidence rating based on whether the determined displacement matches a predetermined pattern, the predetermined pattern being associated with the merchant location.

8. The system of claim 1, wherein the processor is further configured to execute instructions to:
    determine the detected motion characteristic based on two of the acquired device locations over the second predetermined period of time, wherein the detected motion characteristic comprises at least one of speed, acceleration, rotational speed, rotational acceleration, momentum, or force.

9. The system of claim 1, wherein the processor is further configured to execute instructions to:
    determine a displacement between two of the acquired device locations over the first predetermined period of time; and determine the first merchant confidence rating based on whether the determined displacement matches a predetermined displacement.

10. The system of claim 1, wherein the processor is further configured to execute instructions to:
   determine the first and second merchant confidence ratings based on whether the device is connected to a network that is associated with the merchant location.

11. The system of claim 10, wherein the processor is further configured to execute instructions to:
   determine a higher overall merchant confidence rating based on:
      a frequency of use of the network; or
      a signal strength of the network relative to the merchant location.

12. The system of claim 1, wherein the processor is further configured to execute instructions to:
   determine whether the overall merchant confidence rating is less than the first threshold; and
   if the overall merchant confidence rating is less than the first threshold:
      determine whether the overall merchant confidence rating is equal to a second threshold; and
      if the overall merchant confidence rating is equal to the second threshold:
         redetermine the overall merchant confidence rating based on a confidence model, the confidence model being based on a machine learning algorithm and a plurality of historical confidence ratings;
         determine whether the predetermined overall merchant confidence rating is greater than or equal to the first threshold; and
         if the predetermined overall merchant confidence rating is greater than or equal to the first threshold:
            acquire a first merchant identifier associated with the merchant location based on the redetermined overall merchant confidence rating;
            acquire, from the financial service provider, a plurality of available merchant identifiers associated with the one or more merchandising cards of the user of the mobile device;
            determine whether the first merchant identifier matches a second merchant identifier in the available merchant identifiers; and
            if the first merchant identifier matches a second merchant identifier in the available merchant identifiers:
               send a notification to a user of the device indicating that the user is a holder of the card for the first merchant identifier.

13. The system of claim 12, wherein the processor is further configured to execute instructions to:
   train a classification model for the machine learning algorithm using a historic hit-or-miss rate, the historic hit-or-miss rate is associated with past determinations of whether or not a device was at a merchant location.

14. The system of claim 1, wherein the processor is further configured to execute instructions to:
   acquire an activation request from the user, the activation request being generated by the user interacting with the notification; and
   display an image representative of the merchandising card, the displayed image comprising at least one of a first image representing the front of the card or a second image representing the back of the card.

15. A method for managing a merchandising card reminder, the method comprising:
   acquire a plurality of device locations over a network, the device locations being acquired at different instances in time and associated with a mobile device, wherein the plurality of device locations are determined based one of the mobile device's global positioning system (GPS) or network information;
   determining an overall merchant confidence rating based on the acquired device locations over a predetermined period of time, the overall merchant confidence rating comprising a weighted average of a first merchant confidence rating and a second merchant confidence rating, the first merchant confidence rating being based on the acquired device locations over a first predetermined period of time and the second merchant confidence rating being based on the acquired device locations over a second predetermined period of time;
   determining the second merchant confidence rating based on at least one of:
      a detected motion in the acquired device locations over the second predetermined period of time, the detected motion represents of a predetermined pattern of movement,
      a detected motion characteristic in the acquired device locations over the second predetermined period of time, wherein the detected motion characteristic includes at least one of a speed, acceleration, rotational speed, rotational acceleration, momentum, or force; or
      a determination that a displacement between a first acquired device location and a second acquired device location is not within a predetermined range over the second predetermined period of time;
   determining whether the overall merchant confidence rating is greater than a first threshold; and
   if the overall merchant confidence rating is greater than or equal to the first threshold:
      acquiring a first merchant identifier associated with a first merchant location based on the determined overall merchant confidence rating;
      acquiring, from a financial service provider, a set of available merchant identifiers associated with one or more merchandising cards of a user of the mobile device;
      determining whether the first merchant identifier matches a merchant identifier in the set of available merchant identifiers; and
      if the first merchant identifier matches a merchant identifier in the set of available merchant identifiers:
         sending a notification to the mobile device indicating that the user is a holder of the a merchandising card associated with the matched first merchant identifier, wherein the notification is configured to receive a user interaction that causes the mobile device to prepare the merchandizing card for use at the first merchant location.

16. A non-transitory computer-readable storage medium encoded with instructions which, when executed by one or more processors, perform a method for managing a merchandising card reminder, the method comprising:
   acquire a plurality of device locations over a network, the device locations being acquired at different instances in time and associated with a mobile device, wherein the plurality of device locations are determined based one of the mobile device's global positioning system (GPS) or network information;

determining an overall merchant confidence rating based on the acquired device locations over a predetermined period of time, the overall merchant confidence rating comprising a weighted average of a first merchant confidence rating and a second merchant confidence rating, the first merchant confidence rating being based on the acquired device locations over a first predetermined period of time and the second merchant confidence rating being based on the acquired device locations over a second predetermined period of time;

determining the second merchant confidence rating based on at least one of:
- a detected motion in the acquired device locations over the second predetermined period of time, the detected motion represents of a predetermined pattern of movement,
- a detected motion characteristic in the acquired device locations over the second predetermined period of time, wherein the detected motion characteristic includes at least one of a speed, acceleration, rotational speed, rotational acceleration, momentum, or force, or
- a determination that a displacement between a first acquired device location and a second acquired device location is not within a predetermined range over the second predetermined period of time;

determining whether the overall merchant confidence rating is greater than a first threshold; and if the overall merchant confidence rating is greater than or equal to the first threshold:
- acquiring a first merchant identifier associated with a first merchant location based on the determined overall merchant confidence rating;
- acquiring, from a financial service provider, a set of available merchant identifiers associated with one or more merchandising cards of a user of the mobile device;
- determining whether the first merchant identifier matches a merchant identifier in the set of available merchant identifiers; and
- if the first merchant identifier matches a merchant identifier in the set of available merchant identifiers:
- sending a notification to the mobile device indicating that the user is a holder of a merchandising card associated with the matched first merchant identifier, wherein the notification is configured to receive a user interaction that causes the mobile device to prepare the merchandizing card for use at the first merchant location.

\* \* \* \* \*

UNITED STATES PATENT AND TRADEMARK OFFICE
CERTIFICATE OF CORRECTION

PATENT NO. : 10,657,555 B2
APPLICATION NO. : 15/832449
DATED : May 19, 2020
INVENTOR(S) : Dan Givol et al.

Page 1 of 2

It is certified that error appears in the above-identified patent and that said Letters Patent is hereby corrected as shown below:

On the Title Page

Item (57), in the Abstract, Line 16, "with merchandising card," should read --with the merchandising card,--.

Item (57), in the Abstract, Lines 16-17, "send a reminder a user" should read --send a reminder to a user--.

In the Claims

In Claim 1, Column 21, Line 34, "based one" should read --based on one--.

In Claim 1, Column 21, Lines 51-52, "represents of a predetermined pattern" should read --represents a predetermined pattern--.

In Claim 1, Column 22, Line 19, "merchandizing" should read --merchandising--.

In Claim 15, Column 24, Line 6, "based one" should read --based on one--.

In Claim 15, Column 24, Lines 23-24, "represents of a predetermined pattern" should read --represents a predetermined pattern--.

In Claim 15, Column 24, Lines 52-53, "of the a merchandising card" should read --of a merchandising card--.

In Claim 15, Column 24, Line 56, "merchandizing" should read --mechandising--.

In Claim 16, Column 24, Line 65, "based one" should read --based on one--.

Signed and Sealed this
Fourteenth Day of July, 2020

Andrei Iancu
*Director of the United States Patent and Trademark Office*

CERTIFICATE OF CORRECTION (continued)
U.S. Pat. No. 10,657,555 B2

In Claim 16, Column 25, Lines 15-16, "represents of a predetermined pattern" should read --represents a predetermined pattern--.

In Claim 16, Column 26, Line 23, "merchandizing" should read --mechandising--.